United States Patent
Koehler et al.

(10) Patent No.: US 10,435,034 B2
(45) Date of Patent: Oct. 8, 2019

(54) METHOD AND APPARATUS FOR WARNING OF THE WRONG-WAY TRAVEL OF A VEHICLE AFTER AN ACCIDENT AND/OR A SAFETY-CRITICAL DRIVING SITUATION, ESPECIALLY AFTER AN INTERIM STANDSTILL OF THE VEHICLE

(71) Applicant: Robert Bosch GmbH, Stuttgart (DE)

(72) Inventors: Armin Koehler, Sachsenheim (DE); Johannes Ludwig Foltin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/109,335

(22) Filed: Aug. 22, 2018

(65) Prior Publication Data
US 2019/0061784 A1 Feb. 28, 2019

(30) Foreign Application Priority Data

Aug. 28, 2017 (DE) .......................... 10 2017 214 969

(51) Int. Cl.
| | |
|---|---|
| B60W 50/14 | (2012.01) |
| B60R 21/0136 | (2006.01) |
| G08G 1/16 | (2006.01) |
| B60R 21/00 | (2006.01) |

(52) U.S. Cl.
CPC ......... *B60W 50/14* (2013.01); *B60R 21/0136* (2013.01); *G08G 1/16* (2013.01); *B60R 2021/0027* (2013.01); *B60W 2050/143* (2013.01); *B60W 2050/146* (2013.01); *B60W 2520/06* (2013.01); *B60W 2550/22* (2013.01)

(58) Field of Classification Search
CPC ................................. G08G 1/056; G01C 21/26
USPC ....................................... 340/425.5
See application file for complete search history.

(56) References Cited

U.S. PATENT DOCUMENTS

| | | | | |
|---|---|---|---|---|
| 3,753,223 A | * | 8/1973 | Fayling | .................... G08G 1/01 340/905 |
| 2008/0266396 A1 | * | 10/2008 | Stein | .................. G06K 9/00805 348/148 |
| 2009/0189754 A1 | * | 7/2009 | Hochrein | ......... G08G 1/096791 340/436 |
| 2011/0121992 A1 | * | 5/2011 | Konaka | ................ B62D 15/029 340/905 |

(Continued)

FOREIGN PATENT DOCUMENTS

| | | |
|---|---|---|
| DE | 102006050548 A1 | 4/2008 |
| DE | 102013209508 A1 | 11/2014 |

(Continued)

*Primary Examiner* — Fabricio R Murillo Garcia
(74) *Attorney, Agent, or Firm* — Norton Rose Fulbright US LLP; Gerard Messina (57) ABSTRACT

A method for warning of the wrong-way travel of a vehicle after an accident and/or a safety-critical driving situation, especially after an interim standstill of the vehicle, the method including a detecting task, in which a change in a direction of travel of the vehicle after an accident is detected. Finally, the method includes a task of providing a warning signal, the warning signal being provided as a function of a detected change in the direction of travel of the vehicle, to output the warning of the wrong-way travel of the vehicle after the accident and/or the safety-critical driving situation.

20 Claims, 3 Drawing Sheets

(56) References Cited

U.S. PATENT DOCUMENTS

| | | | | |
|---|---|---|---|---|
| 2014/0354454 | A1* | 12/2014 | Nordbruch | G08G 1/056 340/935 |
| 2015/0130643 | A1* | 5/2015 | Nagy | G08G 1/056 340/935 |
| 2017/0025003 | A1* | 1/2017 | Arpin | G01V 8/20 |
| 2018/0050693 | A1* | 2/2018 | Al-Deek | B62D 15/0255 |

FOREIGN PATENT DOCUMENTS

| | | |
|---|---|---|
| DE | 102013224167 A1 | 5/2015 |
| DE | 102014202259 A1 | 8/2015 |
| WO | 2012036050 A1 | 3/2012 |

\* cited by examiner

FIG. 1

FIG. 2

METHOD AND APPARATUS FOR WARNING OF THE WRONG-WAY TRAVEL OF A VEHICLE AFTER AN ACCIDENT AND/OR A SAFETY-CRITICAL DRIVING SITUATION, ESPECIALLY AFTER AN INTERIM STANDSTILL OF THE VEHICLE

RELATED APPLICATION INFORMATION

The present application claims priority to and the benefit of German patent application no. 10 2017 214 969.8, which was filed in Germany on Aug. 28, 2018, the disclosure which is incorporated herein by reference.

FIELD OF THE INVENTION

The present invention is based on a device or a method. The subject matter of the present invention is also a computer program.

BACKGROUND INFORMATION

When a vehicle is involved in an accident in which the vehicle spins around, the driver may conceivably lose consciousness or, in a state of shock, simply drive on, even though after the accident, he is facing counter to a direction of traffic on the roadway. As a consequence, after a first accident, further accidents may occur with following vehicles.

SUMMARY OF THE INVENTION

Against this background, with the approach introduced here, a method is presented for warning of the wrong-way travel of a vehicle after an accident and/or a safety-critical driving situation, especially after an interim standstill of the vehicle, as well as an apparatus which uses this method, and finally, a corresponding computer program according to the description herein. Advantageous further developments of and improvements to the apparatus set forth in the description herein are made possible by the measures delineated in the further descriptions herein.

A method is introduced for warning of the wrong-way travel of a vehicle after an accident and/or a safety-critical driving situation, especially after an interim standstill of the vehicle, the method including the following steps:

Detecting a change in a direction of travel of the vehicle after an accident; and Providing a warning signal as a function of a detected change, in order to output the warning of the wrong-way travel of the vehicle after the accident and/or the safety-critical driving situation.

A wrong-way-travel warning may be a visual, acoustic or haptic warning to the driver of a vehicle traveling the wrong way and/or a warning to external road users (e.g., visual and/or acoustic) and/or transmitted between vehicles using a radio link, for example. Thus, it is also possible to output a warning indirectly via car-2-X, that is, the alien vehicle, which is moving in the opposite direction, informs other vehicles directly (car-2-car) or indirectly via permanently installed receivers (car-2-infrastructure; in general car-2-X) that it is positioned in the opposite direction. The receiving vehicle may then in turn draw the attention of its driver/occupants to the danger of the wrong-way driver with a warning. A safety-critical driving situation may be understood to be a situation which adversely affects the continued travel of the vehicle without danger; for example, such a safety-critical driving situation may be caused by skidding of the vehicle or represent such a skidding.

A vehicle may be a vehicle for the conveyance of passengers, e.g., an automobile, a bus, a truck or a motorcycle. An accident may be a road-traffic accident, resulting here in an occurrence of damage with causative participation of road users in the road traffic. A direction of travel of the vehicle may represent the direction in which the vehicle is moving or should move. A warning signal may represent information about a detected change in the direction of travel of the vehicle after the accident, e.g., the warning signal being visual and/or acoustic and/or (e.g., indirect) via a wireless connection. In this context, the warning signal may be provided using a driving-direction signal and an accident signal by a unit for providing the warning signal. Thus, the use of a car-to-X communication, an entry in a map and/or an automated warning through networked vehicles are conceivable. In this connection, a visual/acoustic transmission of the warning information represents a low-tech solution, while a car-2-X communication represents a more future-oriented high-tech solution.

Traffic messages may often be heard about "ghost drivers" who are driving in the wrong direction on a turnpike. A collision with vehicles traveling the wrong way may have serious consequences. If a vehicle is involved in an accident, as a result, the driver of the vehicle may lose consciousness or, in a state of shock, possibly may simply keep driving. Thus, after a first accident, further accidents may occur owing to the vehicle continuing to travel with increased speed. The approach described here is advantageous due to the recognition of a scenario in which the driver of the vehicle was driving in a different direction prior to the accident than after the accident, in order to output a warning both for the driver of the ego vehicle as well as for external road users based on this knowledge, so as to stop the continued travel of the vehicle as quickly as possible.

According to one specific embodiment, in the providing step, the warning signal may be output when the warning signal represents a change in the direction of travel of the vehicle. For example, with the aid of visual and/or acoustic signals, the warning signal forcibly draws the attention of the driver to a potential danger situation if the driver, confused or in a state of shock, does not recognize that he is driving in the wrong direction.

According to one specific embodiment, in the providing step, the output of the warning signal may be omitted or suppressed if in the detecting step, it is recognized that the direction of travel of the vehicle after the accident corresponds essentially to the direction of travel of the vehicle prior to the accident. For example, the output of the warning signal may be suppressed if the direction of travel after the accident deviates by no more than 60 degrees, especially by no more than 45 degrees from the direction of travel prior to the accident. Should this be the case, no warning signal is output, since in this instance, no significant hazard potential was recognized.

According to one specific embodiment, in the detecting step, a change in the direction of travel of the vehicle may be detected using a magnetic-field signal, which represents a magnetic field of the earth. For example, the magnetic-field signal may be determined by a Hall sensor and permits detection of the orientation of the vehicle in the earth's magnetic field, and therefore ascertainment of the present direction of travel.

According to one specific embodiment, in the detecting step, a change in the direction of travel of the vehicle may be detected using a signal of a global positioning system.

The advantage of this satellite-based positioning system lies in its almost unlimited availability, whereby in addition to a position of the vehicle, a driving route of the vehicle may also be monitored.

According to one specific embodiment, in the detecting step, a change in the direction of travel of the vehicle may be detected using an environment-comparison signal that represents an optically determined position and/or a type of at least one structural fixture prior to and after the accident. In the case of this specific embodiment, using an optical camera, numerous comparison options present themselves like, e.g., traffic signs or guardrails, which permit a very accurate and technically simple ascertainment of the direction of travel.

According to a further specific embodiment, in addition to or as an alternative to the camera, a radar-, lidar- and/or ultrasonic sensor may be used to determine position and orientation of the vehicle relative to the position of structural fixtures. For example, reference points may be determined in the vicinity of the vehicle before and after the accident and assigned to each other based on the return-beam characteristic, for instance. In this way, the orientation of the vehicle may be determined reliably even without camera sensors.

According to one specific embodiment, in the detecting step, a change in the direction of travel of the vehicle may be detected using a driving-direction sensing signal, which represents a direction of travel of external road users. In this case, the front end or the back end of external road users may be compared to each other on the basis of an object-detection sensor system.

According to one specific embodiment, in the detecting step, a change in the direction of travel of the vehicle may be detected using a brightness signal and/or sun-position signal, that represents a shadow cast by an object, especially the vehicle, (e.g., based on the position of the sun) or a stationary object such as a tree or a pole of a traffic light. Thus, depending on the position of the sun, the shadow cast by the vehicle may provide information about its position and/or direction of travel. In addition or alternatively, the shadow cast by surrounding objects may be used, e.g., other road users, trees and/or structural fixtures. This has the advantage that even if the sun is relatively high and therefore the shadow cast is short, the shadow is clearly visible, and a position and direction of travel may be ascertained.

According to a further specific embodiment, in the detecting step, a change in the direction of travel of the vehicle may be determined based on a brightness signal. Thus, for example, the signal of a light sensor may be read in, in order to determine the brightness in an area in front of the vehicle. In this case, in particular, the fact is utilized that more light falls on the light sensor when driving in the direction of the sun than when driving counter to the sun. In addition, structural fixtures and trees/vegetation around the road influence the amount of incident light. Therefore, a position and direction of travel may be determined from the brightness, as well.

According to one specific embodiment, in the providing step, the warning signal is output if during the accident, the vehicle was spun around within a tolerance range by 180° and/or was spun around by a rotation and subsequent steering within a tolerance range by 180°. The rotation-rate sensor offers high offset stability in this case. For example, such a tolerance range may be understood to be a deviation of up to 60 degrees from a change in the direction of travel by 180 degrees.

According to one specific embodiment, with a transmitting step, a warning signal may be transmitted to road users external to the vehicle, especially using a visual and/or acoustic arrangement and/or using a radio link. A warning to external road users offers additional extensive protection in order to avoid a further accident of the vehicle.

One specific embodiment provides the step of implausibilizing, in which the provision of the warning signal is suppressed if the driving-environment sensor for detecting the change in the direction of travel of the vehicle is recognized as defective and/or if a plurality of alien vehicles are detected which are traveling in the same direction as the vehicle. A warning of wrong-way travel which is output erroneously could confuse the driver and external road users unnecessarily and possibly lead to accidents.

According to various embodiment variants, this method may be implemented in software or hardware, for example, or in a mixed form of software and hardware, e.g., in a control device.

The approach introduced here also provides an apparatus which is configured to carry out, control or implement the steps of a variant of a method presented here, in suitable devices. The object of the present invention may be achieved quickly and efficiently by this embodiment variant of the invention in the form of an apparatus, as well.

To that end, the apparatus may have at least one arithmetic logic unit for the processing of signals or data, at least one memory unit for storing signals or data, at least one interface to a sensor or an actuator for reading in sensor signals from the sensor or for the output of data signals or control signals to the actuator and/or at least one communication interface for the reading-in or output of data which are embedded into a communication protocol. The arithmetic logic unit may be a signal processor, a microcontroller or the like, for example, while the memory unit may be a flash memory, an EEPROM or a magnetic memory unit. The communication interface may be configured to read in or output data in wireless and/or conducted fashion, a communication interface which is able to read in or output conducted data having the capability to read in this data electrically or optically from a corresponding data-transmission line, for example, or output it into a corresponding data-transmission line.

In the present case, an apparatus may be understood to be an electrical device which processes sensor signals and outputs control signals and/or data signals as a function thereof. The apparatus may have an interface which may be implemented in hardware and/or software. If implemented in hardware, the interfaces may be part of what is referred to as a system ASIC, for example, that includes a wide variety of functions of the apparatus. However, it is also possible that the interfaces are separate integrated circuits or are made up at least partially of discrete components. If implemented in software, the interfaces may be software modules which are present on a microcontroller, for example, in addition to other software modules.

Of advantage is also a computer-program product or computer program having program code that may be stored on a machine-readable carrier or storage medium such as a semiconductor memory, a hard disk memory or an optical memory and is used to carry out, implement and/or control the steps of the method according to one of the specific embodiments described above, especially when the program product or program is executed on a computer or an apparatus.

Exemplary embodiments of the approach presented here are represented in the drawing and explained in greater detail in the following description.

In the following description of advantageous exemplary embodiments of the present invention, the same or similar

DETAILED DESCRIPTION

Figure 1:
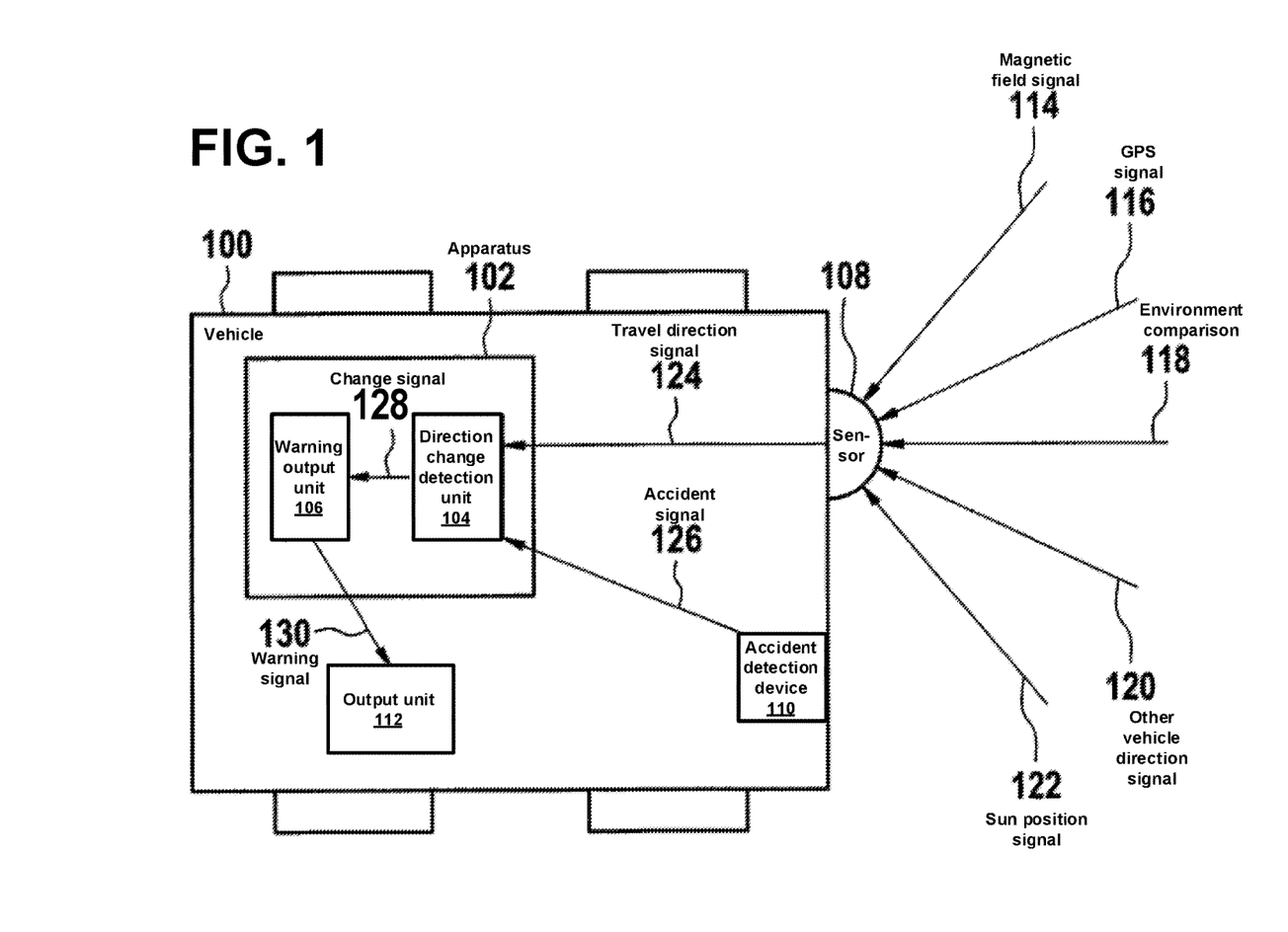
FIG. 1 shows a block diagram of a vehicle together with an apparatus for evaluating a direction of travel according to one exemplary embodiment.

FIG. 1 shows a schematic plan view of a vehicle 100 together with apparatus 102 for evaluating a direction of travel according to one exemplary embodiment. Vehicle 100 is at a standstill after an accident. Vehicle 100 includes an apparatus 102 for assessing a direction of travel, which in turn includes two units. These two units are a unit 104 for detecting a change in the direction of travel and a unit 106 for providing the warning signal. Vehicle 100 also includes at least one driving-environment sensor 108, an accident-detection device 110 and an output unit 112.

Driving-environment sensor 108, which is used to sense the area surrounding vehicle 100, receives at least one signal or a plurality of signals that are used to ascertain the direction of travel of vehicle 100. Thus, driving-environment sensor 108 may receive a magnetic-field signal 114, which represents a magnetic field of the earth, a signal of a global positioning system 116, a driving-environment comparison signal 118 which represents a position detected optically, by radar/lidar and/or by ultrasound, and/or a type of at least one structural fixture before and after the accident, a driving-direction sensing signal 120 which represents a direction of travel of external road users, and/or a sun-position signal 122 which represents a shadow cast by vehicle 100 (e.g., on the basis of the sun position). Driving-environment sensor 108 provides direction-of-travel signal 124 using at least one of these signals 114, 116, 118, 120 or 122.

Unit 104 for detecting a change in the direction of travel, which detects a change in the direction of travel of vehicle 100, receives direction-of-travel signal 124 that is made available by driving-environment sensor 108. In addition, unit 104 for detecting a change in the direction of travel receives an accident signal 126, which is made available by accident-detection device 110 that is used to detect an accident of vehicle 100.

If a change in the direction of travel of vehicle 100 has been detected, unit 104 for detecting a change in the direction of travel makes a change signal 128 available to unit 106 for providing the warning signal. Finally, using change signal 128, a warning signal 130 is made available to output unit 112. The warning of wrong-way travel is output to the driver as well as to external road users with the aid of visual, acoustic and/or haptic pulses. An optional warning to other road users with the aid of a radio link, which may also be called car-2-X, is not shown in the drawing.

The approach presented here may be used in connection with a vehicle 100 which has had an accident and which can spin out of control and stop in a direction opposite the actual direction of travel of vehicle 100. A vehicle driver, who after the accident is confused or awakes from a brief loss of consciousness, may have lost his orientation and try to leave the accident site as quickly as possible. If he has not noticed the rotation of vehicle 100, especially on the turnpike, he will drive against the traffic, which conceivably may lead to further accidents.

Orientating vehicle 100 to the position of the opposite lane is not always possible, e.g., if it is not perceived by the driver or is not close enough. So, for example, the directional roadways of autobahn A8 at the level of the Geislinger Steige (Geislingen Climb) run separately up the mountain, or there are sometimes large median strips between roadways as is the case in Denmark, for example. A similar problem exists in tunnels and other roads, especially if the directional roadways are separated. If a vehicle moving in automated fashion has had an accident, it may then be rotated by the accident. The driver can or should subsequently take control of vehicle 100. If the driver was distracted prior to the accident, then he will not necessarily be able to determine the correct direction of travel. It is possible that the driver, who suddenly is to drive the vehicle without assistance, will drive in the wrong direction and become involved in a further, e.g., serious accident.

Figure 2:
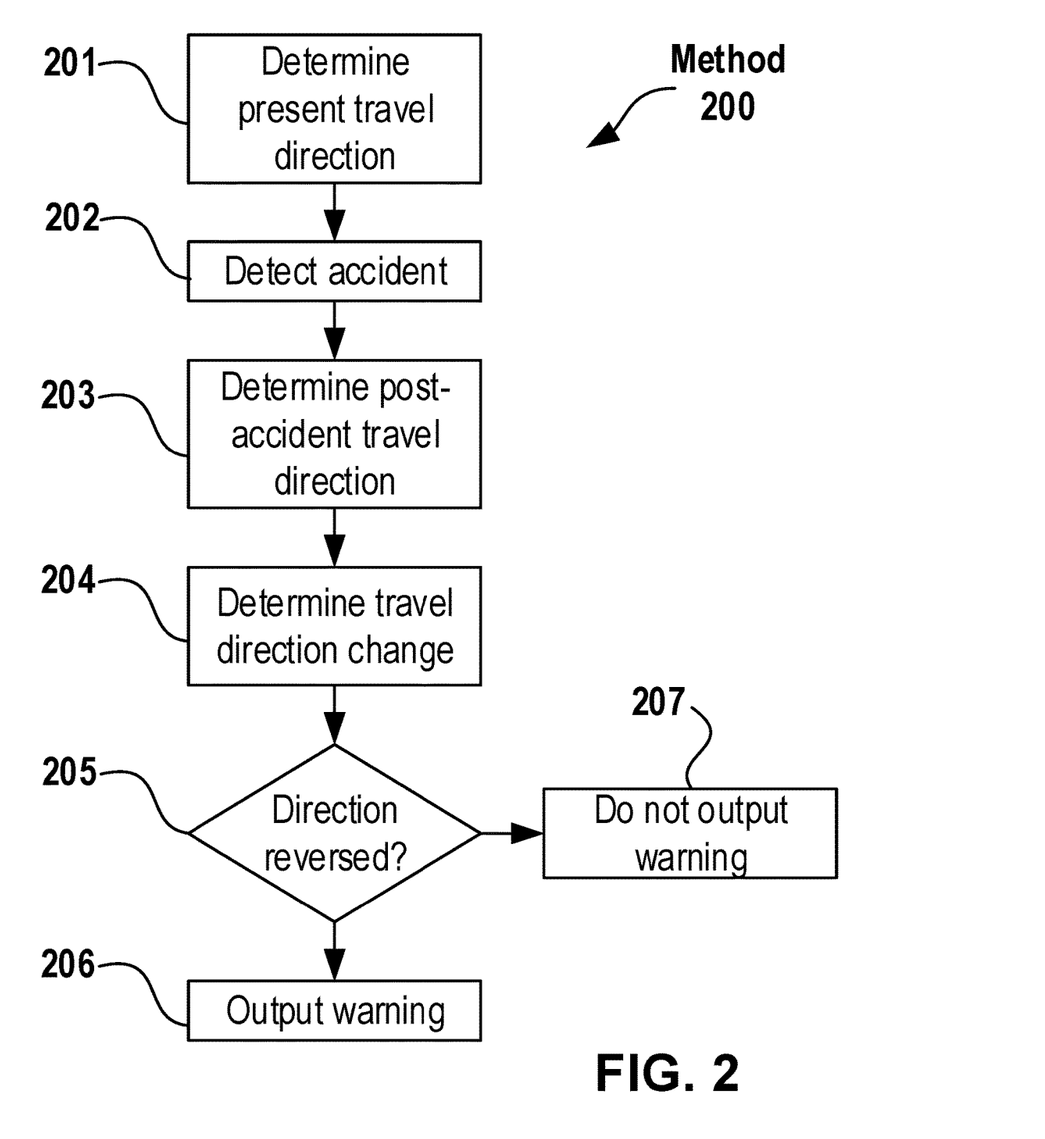
FIG. 2 shows a flowchart of an exemplary embodiment of a method for warning of the wrong-way travel of a vehicle after an accident, particularly after an interim standstill of the vehicle, according to one exemplary embodiment.

FIG. 2 shows a flowchart of an exemplary embodiment of a method 200 for warning of the wrong-way travel of a vehicle after an accident, especially after an interim standstill of the vehicle. For example, the individual blocks may represent steps and be executed using the apparatus, described with the aid of FIG. 1, to evaluate a direction of travel. The arrow lines in the flowchart represent signals and/or connections. The functional blocks are depicted in geometric forms, here rectangles. Possible queries or decisions in the signal flow are represented by a rhombus.

In a first block 201, the present direction of travel of the vehicle is determined. The direction of travel may be determined, for example, on the basis of one or more of the following signals by the driving-environment sensor of the vehicle:

- a magnetic-field signal, which represents the magnetic field of the earth and constitutes a type of electronic compass;
- a signal of a global positioning system, which represents a direction and a speed of the vehicle;
- a driving-environment comparison signal, which compares the structural fixtures before and after the accident:
  Position (& type) of the guardrails
  For example, if a guardrail should be on the left and a guide post on the right, but actually a guardrail is on the right and a guide post is on the left, a rotation after the accident may be assumed and a warning may be output.
  If a concrete guardrail is on the left and a metal guardrail is on the right, a warning may be output if the arrangement has reversed after the accident
  Position of signs and/or bridges: visible/not visible
  Standard signposting: printed side visible before accident, present but not visible after the accident;
- a driving-direction sensing signal which represents the direction of travel of external road users and, for example, compares the visibility of external vehicle sides: rear prior to the accident, front after the accident;

a sun-position signal which represents a shadow cast by the vehicle based on the position of the sun;

an integration of rotational speed in the crash, the rotation of the vehicle upon impact being measured, and the rough orientation of the vehicle being determined by integration, for example; and predicting a model-based rotation of the vehicle.

In addition, it is conceivable that for such a model-based rotation, a small crash simulation is calculated internally in a processor and it is determined whether it would probably result in a rotation. By comparison with the actual accident signals (e.g., crash impulse), the accuracy of the prediction may be increased. By using further information (e.g., acceleration sensor and rotation-rate sensor), the model-based ascertainment of the rotation may be carried out even more precisely.

Instead of the driving-environment sensor, which is able to determine explicitly the direction of travel of the vehicle, a fixed direction of travel of the vehicle may also be assumed, for example.

In a second block 202, an accident of the vehicle is detected by an accident-detection device.

In a third block 203, an instantaneous direction-of-travel signal is now determined using at least one read-in signal of the driving-environment sensor. In determining the direction of travel after the accident by integration of the yaw rate, likewise only the relative direction of travel may be determined. This may be sufficient to warn the driver.

In a block 204, a change in the direction of travel of the vehicle is determined. This block of determining the change in the direction of travel results in rhombus 205 with the question, whether the vehicle has spun around by 180° (e.g., within a tolerance range). If this question is answered in the affirmative, then in a block 206, a warning is output to the driver as well as to external road users. If this question is answered in the negative, in a block 207, no warning is output either to the driver or to the external road users.

The vehicle assesses the direction of travel continuously or shortly before the accident. The vehicle detects the accident. After a standstill of the vehicle, the new direction of travel may be compared to the direction of travel prior to the accident. If the directions of travel do not agree, then the driver is warned that he is possibly driving in the wrong direction.

In a further exemplary embodiment of the approach presented here, the direction of travel prior to the accident is stored in a non-volatile mode, so that it is available after a restart of the vehicle or of the control device, and the driver may be warned immediately. Advantageously, timestamps are co-stored and subsequently compared to each other in order to suppress the warning if the timestamp turns out to be expired or lies too far in the past, which means the time difference between the timestamps would be too great in this case.

In a further exemplary embodiment of the approach presented here, as already mentioned above, the rotation of the vehicle upon impact is measured and the rough orientation of the vehicle is ascertained, for example, by an integration. If the vehicle was spun around by 180° within a tolerance range (e.g., of 60 degrees), or was spun around by the rotation and subsequent steering by a tolerance range of 180° (60°), a warning is output. The tolerance range of the rotation amounts here to 20 degrees or up to 60 degrees. This may be achieved, for example, by integrating the measured values of a rotation-rate sensor or a yaw-rate sensor. In addition, a robust rotation-rate sensor is possibly also necessary for the measurement.

In a further exemplary embodiment of the approach presented here, in addition to or as an alternative to the evaluation of the rotation-rate signals by driving-environment sensors prior to and/or during the accident, an impulse is estimated which acts on the vehicle and/or the movement of the vehicle in and/or after the accident is estimated based on a model. The rotation of the vehicle may be determined from the vehicle movement estimated and/or compared to the reality. If the vehicle is then in turn standing or moving counter to the direction of traffic, the warning is output.

In another exemplary embodiment of the approach presented here, the wrong-way-travel warning is suppressed after an implausiblizing step. For example, such a suppression may take place if the driving-environment sensor, which is substantially responsible for detecting the direction of travel and for triggering the warning function, has completely or partially failed, is obscured or is no longer mounted correctly, since in this context, too great a deviation would ensue in the case of an online calibration of the driving-environment sensor, or the driving-environment sensor would no longer be calibratable or calibrated.

In a further exemplary embodiment of the approach presented here, the wrong-way-travel warning is suppressed in the implausiblizing step if one or more external road users are detected in the traffic lane, which are moving in the same direction as the ego vehicle. Additionally or alternatively, evaluation of the external road users in the lanes to the left of the vehicle (in the case of right-hand traffic) is possible. On turnpikes or on roads with separate directional roadways, all lanes which lead in one direction may be evaluated.

In another exemplary embodiment of the approach presented here, the method outlined is controlled with the aid of navigation data, in order to detect whether the vehicle is on a turnpike or a highway with separate directional roadways.

In another exemplary embodiment of the approach presented here, the turnpike is detected and therefore the function is activated if the speed of the vehicle and/or external road users exceeds a certain speed limit, e.g., 120 km/h.

In a further exemplary embodiment of the approach presented here, the method outlined is only used to evaluate objects near to or in a traffic lane, so that its use is also possible in the case of highways without separate directional roadways. In addition, to that end, the steering-wheel position may also be evaluated. Likewise, a "tourist-mode signal" may be evaluated, which is used in the case of headlights, to visually utilize the asymmetrical portion upon the change from left-hand traffic to right-hand traffic and vice versa, in order to determine the correct side to drive for the vehicle. If, according to the signal, the driver is on the wrong side after the accident, he is warned.

In a further exemplary embodiment of the approach presented here, the vehicle, that is, the apparatus detects, based on periodically oncoming traffic, for example, that it is not on a highway with separate traffic lanes. Prior to the accident, the vehicle, that is, the apparatus stores the lane in which the vehicle is located. If, after the accident, the vehicle is in an incorrect lane, the driver is warned. This is especially advantageous when, in some countries, one is driving on the opposite side of the road, and after an accident, can become really confused.

In another exemplary embodiment of the approach presented here, the warning signal is additionally or alternatively communicated to the outside, in order to warn external road users. For example, this may be accomplished at a relatively high technical level wirelessly by radio, or, e.g., at a lower level by the activation of light-giving devices and other devices of the vehicle for interacting with external road users, for instance, via emergency flasher, headlight flasher or acoustic horn.

In a further exemplary embodiment of the approach presented here, the activation of the wrong-way-travel warning function is already possible in response to skidding of the vehicle (without accident), should the vehicle no longer be controllable because of an icy spot, for example, stop in the opposite direction, and the driver really wants to get as quickly as possible to the desired speed again. In principle, this specific embodiment is already able to be realized with today's ESP systems.

In another exemplary embodiment of the approach presented here, the driver is not warned that he is traveling as a ghost driver, but rather merely receives a notice that previously he was driving in the other direction of travel. This is particularly helpful in the case of a skidding scenario on country roads, so that the driver does not drive back again. In this way, possible over-reactions on the part of the driver in case of false detection may also be avoided.

In one particularly sensible exemplary embodiment of the approach presented here, a sharp change in direction, e.g., in conjunction with the crossing of lanes by the vehicle and/or reversing, is likewise evaluated. A turning maneuver on a turnpike may also lead to a warning. For example, this is intended to prevent persons who are confused or exhausted, from turning around by mistake on the turnpike and driving in the wrong direction, especially at night.

Finally, in one exemplary embodiment of the approach presented here, the drive to a rest area may be used for measuring a direction reference, which is compared with the direction of travel after leaving the rest area. If there is a significant difference, a warning is implemented (even without previous accident). This warning of wrong-way travel may be used separately, but also in support of the wrong-way-travel warning function already developed via signs.

Figure 3:
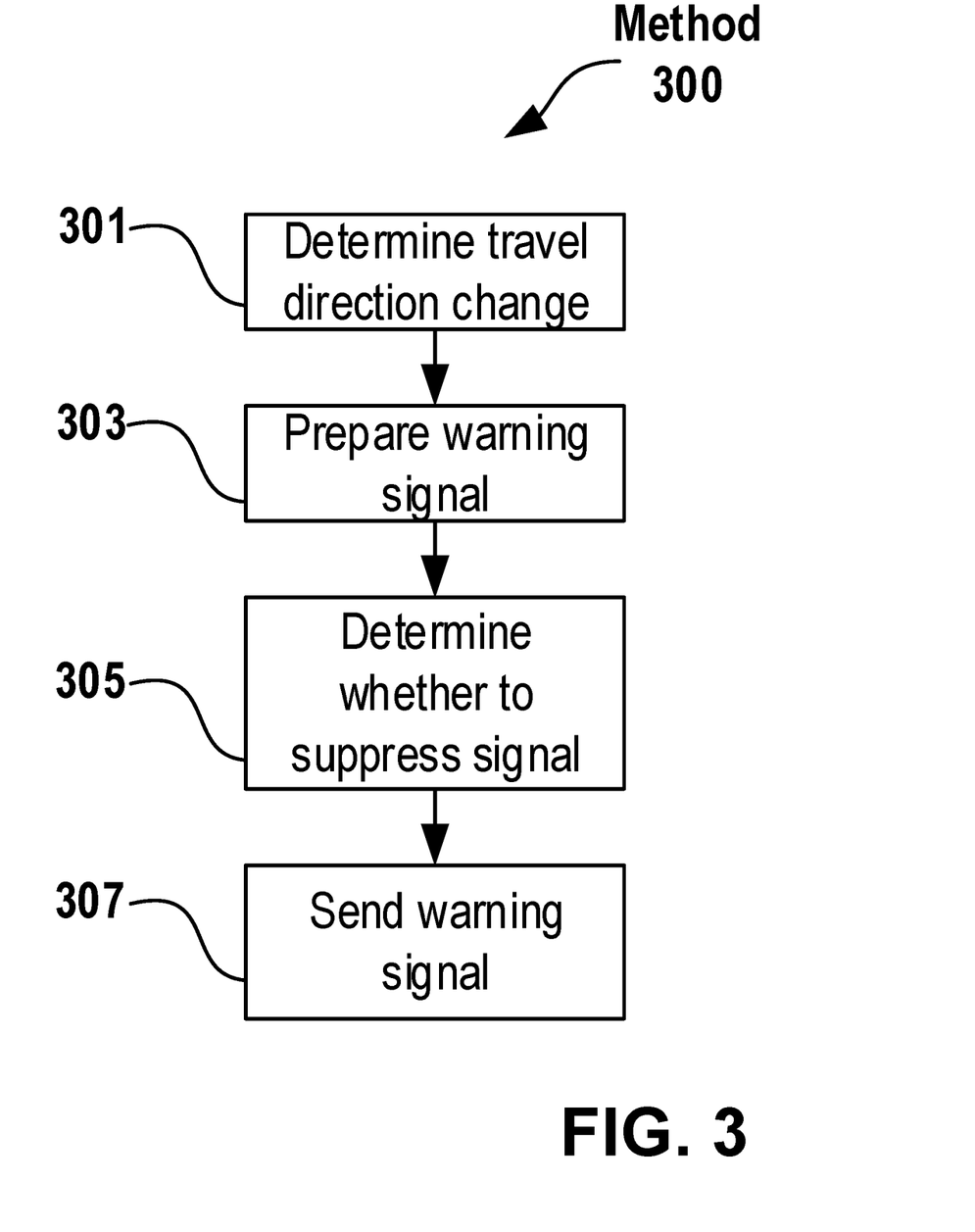
FIG. 3 shows a flowchart of an exemplary embodiment of a method for warning of the wrong-way travel of a vehicle after an accident, particularly after an interim standstill of the vehicle, according to one exemplary embodiment.

FIG. 3 shows a flowchart of an exemplary embodiment of a method 300 for warning of the wrong-way travel of a vehicle after an accident and/or a safety-critical driving situation, especially after an interim standstill of the vehicle according to one exemplary embodiment. For example, method 300 may be carried out using the apparatus, described with the aid of FIG. 1, for evaluating a direction of travel.

The method includes a step 301, in which the change in a direction of travel of the vehicle after an accident is detected.

In a step 303, the warning signal is made available as a function of a detected change in the direction of travel of the vehicle, in order to output the warning of the wrong-way travel of the vehicle after the accident and/or the safety-critical driving situation.

However, in a step 305 of implausibilizing, the provision of the warning signal may be suppressed if the driving-environment sensor for detecting a change in the direction of travel of the vehicle is recognized as defective and/or if a plurality of alien vehicles are detected which are traveling in the same direction as the vehicle.

Finally, in a step 307, the warning signal is sent out to road users external to the vehicle, especially using a visual and/or acoustic arrangement.

If an exemplary embodiment includes an "and/or" link between a first feature and a second feature, this is to be read in such a way that the exemplary embodiment according to one specific embodiment has both the first feature and the second feature, and according to a further specific embodiment, has either only the first feature or only the second feature.

What is claimed is:

1. A method comprising:
   detecting, by a vehicle, occurrence of an accident or an emergency event that adversely affects a driver of the vehicle to drive the vehicle;
   detecting that a direction of travel of the vehicle has changed from a first travel direction before the detected occurrence of the accident or emergency event to a second travel direction after the detected occurrence of the accident or emergency event, wherein a possible cause for the travel of the vehicle in the second travel direction instead of the first travel direction is determined to be a loss of orientation of the driver of the vehicle due to the accident or emergency event; and
   responsive to the determination, which is based on a combination of the detection of the occurrence of the accident or emergency event and the detection of the change of the direction of travel, triggering output of a warning of wrong-way travel by the vehicle indicating to the driver that the vehicle is traveling in the second travel direction instead of the first travel direction, wherein the warning of wrong-way travel is output when the second travel direction is out of a tolerance range deviation from the first travel direction.

2. The method of claim 1, wherein the triggering is performed conditional upon that the second travel direction is angularly offset from the first travel direction by at least a predefined threshold angular offset.

3. The method of claim 1, wherein the change in the direction of travel is detected using a magnetic-field signal that represents a magnetic field of Earth.

4. The method of claim 1, wherein the change in the direction of travel is detected using a signal of a global positioning system.

5. The method of claim 1, wherein the change in the direction of travel is detected using an environment-comparison signal that represents a position determined prior to and after the occurrence of the accident or emergency event, and the determination of the position is performed (a) optically by radar and/or lidar, (b) by ultrasound, and/or (c) based on a detection of a type of at least one structural fixture in a vehicle environment.

6. The method of claim 1, wherein the change in the direction of travel of the vehicle is detected using a driving-direction sensing signal that represents a direction of travel of external road users.

7. The method of claim 1, wherein the change in the direction of travel is detected using a sun-position signal that represents a shadow cast by an object.

8. The method of claim 1, wherein the triggering is performed conditional upon that the second travel direction is angularly offset from the first travel direction by at least a number of degrees that is within a tolerance range of 180°.

9. The method of claim 1, wherein the output of the warning includes transmitting a warning signal to a road user external to the vehicle.

10. The method of claim 1, wherein the triggering is performed based on satisfaction of a condition that a driving-environment sensor used for detecting the change is not recognized as defective.

11. The method of claim 1, wherein the change in the direction of travel is detected using (a) a sun-position signal that represents a shadow cast by the vehicle or by a stationary object and/or (b) a brightness signal.

12. The method of claim 1, wherein the output of the warning includes transmitting a warning signal to a road user external to the vehicle, the warning signal being transmitted via at least one of a visual arrangement, an acoustic arrangement, and a radio link.

13. The method of claim 1, wherein the triggering is performed responsive to a determination of satisfaction of a condition that the second travel direction is detected within a predefined threshold amount of time from the detection of the occurrence of the accident or emergency event.

14. The method of claim 1, wherein the triggering is performed based on satisfaction of a condition that there is not a detection of a plurality of external vehicles traveling in the second travel direction.

15. The method of claim 1, wherein the change in the direction of travel is detected using a brightness signal.

16. An apparatus of a vehicle, the apparatus comprising:
a sensor arrangement; and
a processor, wherein the processor is configured to:
detect, based on output of the sensor arrangement, (a) occurrence of an accident or an emergency event that adversely affects a driver of the vehicle to drive the vehicle and (b) that a direction of travel of the vehicle has changed from a first travel direction before the detected occurrence of the accident or emergency event to a second travel direction after the detected occurrence of the accident or emergency event, wherein a possible cause for the travel of the vehicle in the second travel direction instead of the first travel direction is determined to be a loss of orientation of the driver of the vehicle due to the accident or emergency event; and
responsive to the determination, which is based on a combination of the detection of the occurrence of the accident or emergency event and the detection of the change of the direction of travel, trigger output of a warning of wrong-way travel by the vehicle indicating to the driver that the vehicle is traveling in the second travel direction instead of the first travel direction, wherein the warning of wrong-way travel is output when the second travel direction is out of a tolerance range deviation from the first travel direction.

17. The apparatus of claim 16, wherein the processor is configured to perform the triggering of the output of the warning based on the detection of the change in the direction of travel only if the second travel direction is determined by the processor to be associated with a travel of the vehicle after a standstill of the vehicle that occurs after the detection of the occurrence of the accident or emergency event.

18. The apparatus of claim 16, wherein the processor is configured to perform the triggering of the output of the warning based on the detection of the change in the direction of travel only if the second travel direction is detected within a threshold maximum amount of time after the detection of the occurrence of the accident or emergency event.

19. A non-transitory computer readable medium on which are stored instructions that are executable by a processor of a vehicle and that, when executed by the processor, cause the processor to perform a method, the method comprising:
detecting occurrence of an accident or an emergency event that adversely affects a driver of the vehicle to drive the vehicle;
detecting that a direction of travel of the vehicle has changed from a first travel direction before the detected occurrence of the accident or emergency event to a second travel direction after the detected occurrence of the accident or emergency event, wherein a possible cause for the travel of the vehicle in the second travel direction instead of the first travel direction is determined to be a loss of orientation of the driver of the vehicle due to the accident or emergency event; and
responsive to the determination, which is based on a combination of the detection of the occurrence of the accident or emergency event and the detection of the change of the direction of travel, triggering output of a warning of wrong-way travel by the vehicle indicating to the driver that the vehicle is traveling in the second travel direction instead of the first travel direction, wherein the warning of wrong-way travel is output when the second travel direction is out of a tolerance range deviation from the first travel direction.

20. The non-transitory computer readable medium of claim 19, wherein the triggering is performed conditional upon that the second travel direction is angularly offset from the first travel direction by at least a predefined threshold angular offset.

* * * * *